A. WITTING.
AUTOMOBILE STEERING WHEEL HOLDING MEANS.
APPLICATION FILED JULY 6, 1915.
1,174,924.
Patented Mar. 7, 1916.
2 SHEETS—SHEET 1.
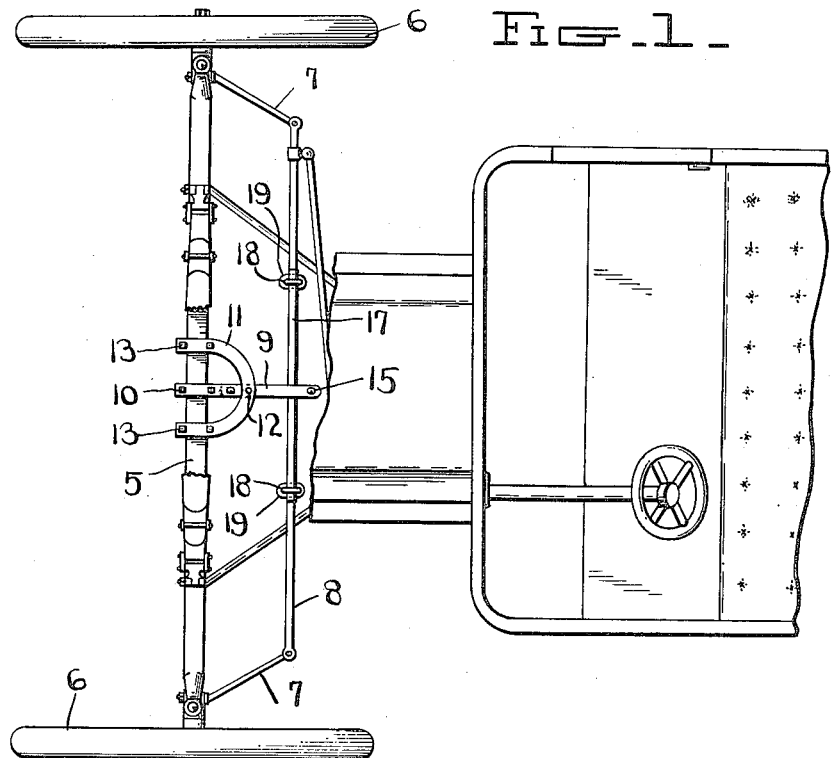
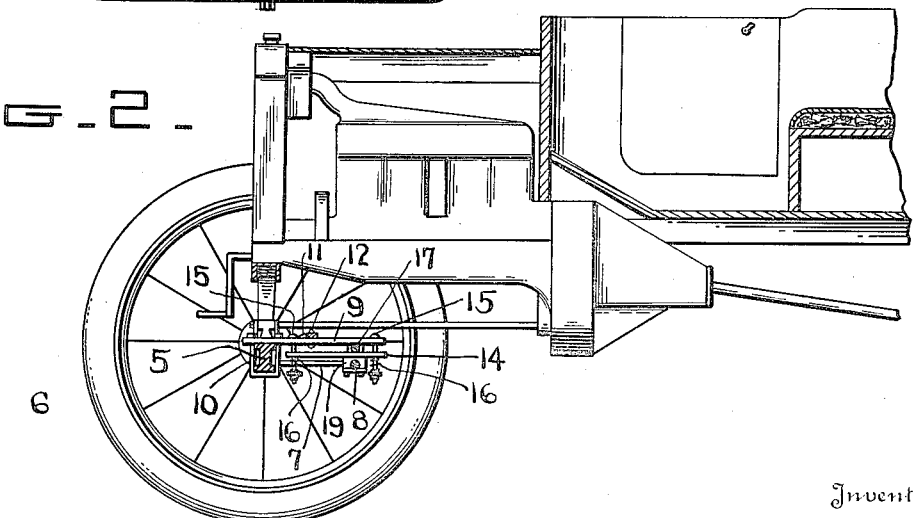
Witness
L. B. James
Inventor
August Witting
By
Attorney A. WITTING.
AUTOMOBILE STEERING WHEEL HOLDING MEANS.
APPLICATION FILED JULY 6, 1915.
1,174,924.
Patented Mar. 7, 1916.
2 SHEETS—SHEET 2.
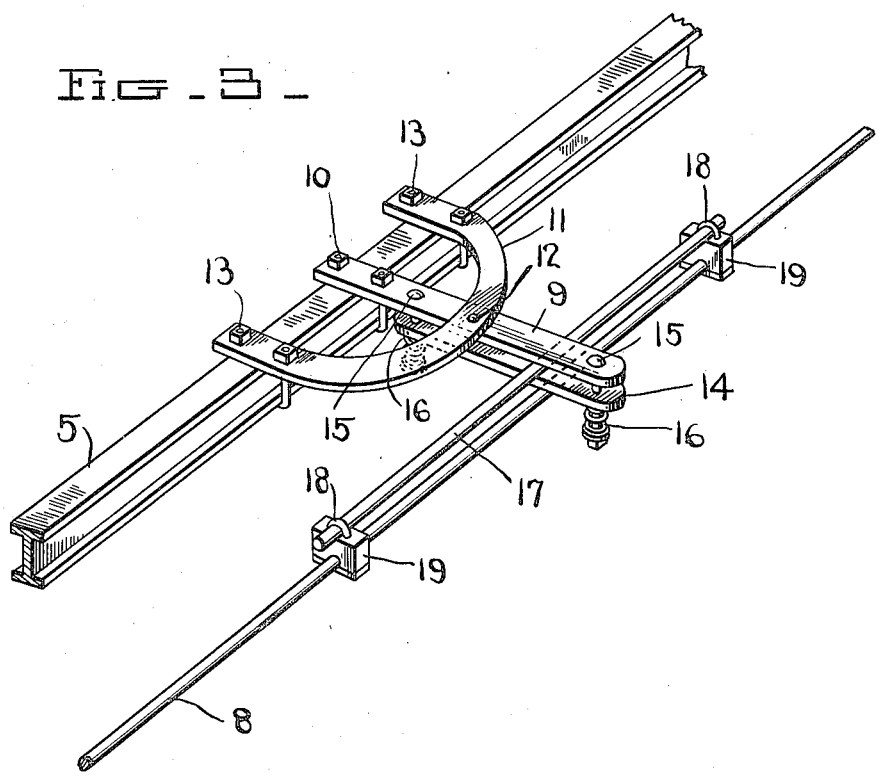
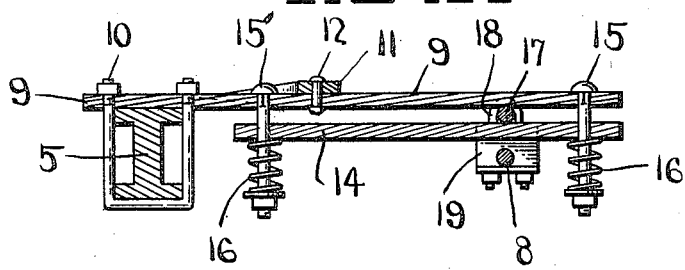

UNITED STATES PATENT OFFICE.

AUGUST WITTING, OF NEW SALEM, NORTH DAKOTA.

AUTOMOBILE-STEERING-WHEEL-HOLDING MEANS.

1,174,924.  Specification of Letters Patent.  Patented Mar. 7, 1916.

Application filed July 6, 1915. Serial No. 38,314.

*To all whom it may concern:*

Be it known that I, AUGUST WITTING, a citizen of the United States, residing at New Salem, in the county of Morton and State of North Dakota, have invented new and useful Improvements in Automobile-Steering-Wheel-Holding Means, of which the following is a specification.

The present invention relates to means for holding the steering wheels of an automobile in adjusted relation, thereby relieving the operator of holding the wheels, said means at the same time permitting any desired change in adjustment without difficulty.

A further object is to provide a simple, inexpensive and effective attachment which may be applied to various well known types of automobiles without the necessity of altering the structure of the same or modifying any parts.

The preferred embodiment of the invention is illustrated in the accompanying drawings, wherein:—

Figure 1 is a plan view of the front portion of an automobile, with the parts thereof broken away and illustrating the attachment in place. Fig. 2 is a vertical sectional view therethrough. Fig. 3 is a detail perspective view of the attachment and the parts to which it is applied, and Fig. 4 is a vertical sectional view.

Similar reference numerals designate corresponding parts in all the figures of the drawings.

In the embodiment illustrated, the automobile which may be of any desired or well known character, includes a front axle 5, on the ends of which are pivotally mounted steering wheels 6 in any well known manner, the stub axles or knuckles on which said wheels are mounted having the usual rearwardly extending arms 7 connected by a transversely disposed steering rod 8, this rod being disposed parallel to and in rear of the axle 5. Inasmuch as these parts are well known to those skilled in the art, it is believed to be unnecessary to further describe the same or the automobile structure.

Secured to the center of the axle 5 and extending rearwardly thereof is a friction plate 9, fastened to said axle by a U-bolt or clip 10, said plate extending transversely across the steering rod 8. The plate is preferably braced against lateral play by a curved bar 11 suitably secured to the plate 9 between its ends, as shown at 12, and having its terminals extending across the axle 5 and secured thereto as shown at 13. Another friction element in the form of a plate 14 is disposed alongside the plate 9 and may be either above or below it. In the present embodiment, it is shown below and is slidably mounted on a pair of bolts 15 which pass through the friction plate 9. Springs 16, mounted on the projecting ends of the bolts, bear against the plate 14 and thus yieldingly urge it toward the plate 9.

A longitudinally slidable holding rod or steering rod element 17 passes between the plates 9 and 14 and may be of any desired cross sectional shape. This rod 17 has its ends secured by clips 18 to the steering rod 8 on opposite sides of the plates 9 and 14, blocks 19 being interposed between the rods 8 and 17 to hold the same in spaced relation, and these blocks being recessed to properly engage the parts. With this device, it will be evident that the plates 9 and 14 will be maintained in frictional engagement with the rod 17, and inasmuch as said rod is secured to the steering rod 8, said rod 8 will be frictionally held in any desired position. Thus, if the wheels 6 are placed straight ahead the operator does not have to manually hold them in that position as the clamping plates 9 and 14 gripping the rod 17 will thus maintain them. At the same time the operator by turning the steering wheel can in like manner adjust the front wheels and when adjusted they will be maintained. It will also be evident that this device is inexpensive and can be readily applied inasmuch as there is no necessity of altering or modifying the parts of the automobile.

From the foregoing, it is thought that the construction, operation and many advantages of the herein described invention will be apparent to those skilled in the art without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is:—

1. In apparatus of the character set forth, the combination with a friction rod, of clips for attaching the same at spaced points to a steering rod of an automobile, a pair of yielding friction devices that embrace the rod, one being located between said rod and the steering rod and between the clips, and means for mounting the yielding friction devices on the axle of an automobile.

2. In an apparatus of the character set forth, the combination with spaced friction plates, of means for yieldingly urging them toward each other, means for mounting the same on an automobile, and a steering rod element longitudinally slidable between the plates and frictionally held thereby to hold the steering wheels in different adjusted relations.

3. In apparatus of the character set forth, the combination with spaced friction plates, of spaced yielding connections between said plates, and clamping devices for attaching one of the plates to the axle of an automobile, said plates being adapted to frictionally engage and hold a steering rod element placed therebetween.

In testimony whereof I have hereunto set my hand in presence of two subscribing witnesses.

AUGUST WITTING.

Witnesses:
J. V. McCormick,
F. H. Ellewin.